(12) United States Patent
Kinoshita et al.

(10) Patent No.: US 7,841,213 B2
(45) Date of Patent: Nov. 30, 2010

(54) METHOD OF MANUFACTURING PHOTONIC CRYSTAL FIBER USING STRUCTURE-INDICATING RODS OR CAPILLARIES

(75) Inventors: Takaharu Kinoshita, Hyogo (JP); Nobusada Nagae, Hyogo (JP); Akihiko Fukuda, Hyogo (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 1066 days.

(21) Appl. No.: 10/543,294

(22) PCT Filed: Feb. 9, 2004

(86) PCT No.: PCT/JP2004/001333

§ 371 (c)(1),
(2), (4) Date: Jul. 26, 2005

(87) PCT Pub. No.: WO2004/071977

PCT Pub. Date: Aug. 26, 2004

(65) Prior Publication Data

US 2006/0096325 A1 May 11, 2006

(30) Foreign Application Priority Data

Feb. 12, 2003 (JP) ............................. 2003-033548

(51) Int. Cl.
*C03B 37/028* (2006.01)
(52) U.S. Cl. ............................. 65/393; 65/409; 65/412
(58) Field of Classification Search .................. 65/409, 65/393, 412, 403, 411, 428
See application file for complete search history.

(56) References Cited

U.S. PATENT DOCUMENTS

| 3,679,384 | A | | 7/1972 | Colson et al. |
| 4,101,303 | A | | 7/1978 | Balkwill |
| 4,902,324 | A | * | 2/1990 | Miller et al. .................. 65/407 |
| 5,017,206 | A | * | 5/1991 | Miller et al. .................. 65/406 |
| 5,802,236 | A | * | 9/1998 | DiGiovanni et al. ......... 385/127 |
| 6,243,522 | B1 | * | 6/2001 | Allan et al. .................. 385/123 |

(Continued)

FOREIGN PATENT DOCUMENTS

EP     1234806     8/2002

(Continued)

OTHER PUBLICATIONS

English Language Abstract of JP 1-219033.

(Continued)

*Primary Examiner*—John Hoffmann
(74) *Attorney, Agent, or Firm*—Greenblum & Bernstein P.L.C.

(57) ABSTRACT

A method for manufacturing a photonic crystal fiber including arranging a spacer formed of two or more spacer parts in a support tube such that the inner wall surface of the support tube has a substantially regular polygonal cross-sectional shape which allows closest packing of a core rod and a plurality of capillaries or the capillaries only; and forming a preform by packing in a support tube the core rod for forming a solid core and the capillaries for forming a cladding, or by providing a core space for forming a hollow core in a support tube and packing in the support tube a plurality of capillaries for forming the cladding; and drawing the preform into a fiber under heating.

1 Claim, 6 Drawing Sheets

U.S. PATENT DOCUMENTS

| | | | |
|---|---|---|---|
| 6,287,487 B1 | 9/2001 | Elledge et al. | |
| 6,375,149 B1 | 4/2002 | Elledge et al. | |
| 6,404,966 B1 * | 6/2002 | Kawanishi et al. | 385/125 |
| 6,427,491 B1 * | 8/2002 | Burke et al. | 65/403 |
| 6,522,433 B2 * | 2/2003 | Kelsey et al. | 359/34 |
| 6,542,681 B2 * | 4/2003 | Broeng et al. | 385/123 |
| 6,603,600 B2 * | 8/2003 | Pang | 359/348 |
| 6,795,635 B1 * | 9/2004 | Fajardo et al. | 385/140 |
| 7,080,529 B2 * | 7/2006 | Dowd et al. | 65/393 |
| 2002/0118938 A1 * | 8/2002 | Hasegawa et al. | 385/125 |
| 2003/0056550 A1 * | 3/2003 | Tanaka et al. | 65/428 |

FOREIGN PATENT DOCUMENTS

| | | | |
|---|---|---|---|
| EP | 1325893 | | 7/2003 |
| JP | 57-92303 | | 6/1982 |
| JP | 59-019902 | * | 2/1984 |
| JP | 1-219033 | | 9/1989 |
| JP | 4-224129 | | 8/1992 |
| JP | 2002-097034 | | 4/2002 |
| JP | 2002-249335 | | 9/2002 |

OTHER PUBLICATIONS

English language Abstract of JP 2002-097034.
English language Abstract of JP 4-224129.
English language Abstract of JP 57-92303.
English language Abstract of JP 2002-249335.

* cited by examiner

METHOD OF MANUFACTURING PHOTONIC CRYSTAL FIBER USING STRUCTURE-INDICATING RODS OR CAPILLARIES

TECHNICAL FIELD

The present invention relates to a method for manufacturing a photonic crystal fiber (hereinafter abbreviated as PCF) having a fiber body including a core and a cladding (porous part) which surrounds the core and has a plurality of pores extending along the core.

BACKGROUND ART

Optical fibers including a core and a cladding are well known as a light-transmitting medium. Among them, in recent years, attention has been paid to PCFs as promising optical fibers which allow communications in a novel wavelength band that have not been realized with conventional optical fibers and offer enhanced communication speed with reduced costs. The PCF includes a solid or hollow core which is provided in the center of the fiber and a cladding which surrounds the core and has a plurality of pores extending along the core. The PCF encloses light in the core surrounded by the cladding to transmit the light and controls the dispersion of light wavelength without restraint by changing the size of or the interval between the pores.

The PCF may be formed by: filling a cylindrical support tube with a plurality of capillaries for forming the cladding such that the capillaries are closest-packed therein when viewed in section; providing a core rod for forming the solid core or core space for forming the hollow core at the center axis position to obtain a preform; and thinning the preform by heating and drawing. This is called a stack-and-draw technique. This technique is a universal one because it allows relatively easy manufacture of PCFs having a large number of pores.

According to the stack-and-draw technique, however, the cylindrical, ultrasmall-diameter capillaries freely roll within the large-diameter support tube along the circumferential direction of the support tube. Since the positions of the capillaries are not fixed within the support tube while packing the capillaries into the support tube, there is a problem of great difficulty in closest-packing the cylindrical capillaries in the cylindrical support tube. For example, as shown in FIG. 6, the support tube 3 is not completely filled with the capillaries 1 and the capillaries 1 are spaced from each other or the arrangement of the capillaries 1 is disturbed. As a result, the center axis of the core rod 2 for forming the core may be misaligned from the center axis of the support tube 3. In such a case, about 70% of the capillaries 1 functions as photonic crystal after drawing. Therefore, JP2002-97034A has disclosed a technique of providing the inner wall surface of the support tube 3 with a substantially regular hexagonal cross-sectional shape.

Giving the substantially regular hexagonal cross-sectional shape to the inner wall surface of the support tube 3 is advantageous for the closest packing of the capillaries 1. However, to obtain the inner wall surface of the support tube 3 having the substantially regular hexagonal cross-sectional shape, there is no other way than to use a common grinding technique. Therefore, it is difficult to grind a columnar rod into a cylinder with great precision to give the inner wall surface thereof the substantially regular hexagonal cross-sectional shape. Further, the length of the support tube 3 to be obtained is limited to as short as about 200 mm. Therefore, this technique is not suitable for fabricating a long PCF. Thus, the technique of forming the support tube 3 whose inner wall surface has the substantially regular hexagonal cross-sectional shape is unrealistic from the technical and economic viewpoints.

On the other hand, for optical fiber sensors and coherent optical communications making use of polarization and coherence of light, polarization maintaining optical fibers have been used which maintain the polarization of transmitting light and have high polarization stability. Taking the wavelength dispersion property as an advantage, use of the above-described PCFs as the polarization maintaining PCFs has been studied. To fabricate the polarization maintaining PCFs, a twist should be added to the core or the arrangement of the pores around the core. For example, the core may be oval or rectangular when viewed in section or some of the pores adjacent to the core may be given with different diameter from the others.

As to the polarization maintaining PCFs which place great importance on axiality, the closest packing of the capillaries in the support tube is still extremely difficult. Therefore, it is difficult to fabricate the PCF in which all the pores in the cladding function as photonic crystal.

DISCLOSURE OF THE INVENTION

An object of the present invention is to provide a method for manufacturing a PCF which allows closest packing of capillaries for forming a cladding in an easy and reliable manner.

The present invention provides a method for manufacturing a photonic crystal fiber comprising a solid or hollow core and a cladding which surrounds the core and has a plurality of pores extending along the core. The method comprises the steps of: forming a preform by packing in a support tube a core rod for forming the solid core and a plurality of capillaries for forming the cladding, or by providing a core space for forming the hollow core in the support tube and packing in a support tube a plurality of capillaries for forming the cladding; and drawing the preform into a fiber under heating, wherein a spacer formed of two or more spacer parts is arranged in the support tube such that the inner wall surface of the support tube has a substantially regular polygonal cross-sectional shape which allows closest packing of the core rod and the capillaries or the capillaries only.

According to the above-described manufacturing method, a spacer is arranged between the support tube and the capillaries to provide the inner wall surface of the support tube with a substantially regular hexagonal cross-sectional shape which allows closest packing of the core rod and the capillaries or the capillaries only. The thus arranged spacer prevents the capillaries from being disarranged and the core from being misaligned with the center. As a result, a preform is obtained while almost all the capillaries are closest packed as a bundle in the support tube via the spacer. Then, by drawing the preform into a thin fiber, almost 100% of the packed capillaries function as photonic crystal after the drawing. Since the arrangement of the capillaries is controlled by the spacer, the capillaries for forming the cladding are closest packed with ease and reliability. Further, since the spacer is formed of two or more spacer parts, the inner wall surface of the spacer is shaped to have a desired substantially polygonal cross-sectional shape in an easy and reliable manner. Since the method is also applicable to a long support tube, a long PCF is obtained.

According to the method for manufacturing the PCF of the present invention, the spacer may give a substantially regular hexagonal cross-sectional shape to the inner wall surface of the support tube.

In the above-described method, the inner wall surface of the spacer is given a substantially regular hexagonal cross-sectional shape. Therefore, in filling the support tube with the cylindrical capillaries of the same diameter, the capillaries are laid side by side over one of the sides of the inner wall surface of the spacer to form a first layer of capillaries and then additional capillaries are stacked on the first layer to fit between adjacent pairs of the capillaries forming the first layer to form a second layer. By repeating these steps, the capillaries are closest packed in the support tube. Thus, it is hardly necessary to take care not to disturb the arrangement of the capillaries and therefore the packing of the capillaries in the support tube is carried out with higher efficiency. This allows the closest packing of the capillaries for forming the cladding in an easy and reliable manner.

According to the method for manufacturing the PCF of the present invention, the cross-sectional shape of the inner wall surface of the support tube may be so designed that all of the capillaries facing the inner wall surface of the spacer are kept in contact with the spacer inner wall surface when the preform formed by closest packing of the core rod and the capillaries or the capillaries only is drawn into a fiber.

In the above-described method, the degree of freedom of the capillaries in the drawing step is greatly reduced. Therefore, the capillaries are effectively prevented from being disarranged. Further, if the cross-sectional shape of the inner wall surface of the spacer is adjusted, capillaries of various diameters can be employed.

According to the method for manufacturing the PCF of the present invention, adjacent sides of the substantially regular polygonal cross-sectional shape of the spacer inner wall surface may be connected by arcs, respectively, each of the arcs having a radius which is not larger than ½ of the maximum diameter of the capillaries packed in the support tube.

The substantially polygonal cross-sectional shape of the inner wall surface of the spacer includes, in addition to a so-called polygon, a polygon in which adjacent sides are connected by arcs, respectively, to form round corners. To form a substantial polygon by connecting adjacent sides by the arcs, the radius of each of the arcs is not larger than ½ of the maximum diameter of the capillaries. If the radius of the arc is larger than ½ of the maximum diameter of the capillaries, the capillaries to be arranged at the corners do not fit into the corners properly, thereby hindering the closest packing of the capillaries.

According to the method for manufacturing the PCF of the present invention, the spacer includes chipped parts for providing insertion holes which extend in the lengthwise direction thereof between the spacer and the support tube and structure-indicating rods or capillaries may be fitted into the insertion holes.

In the above-described method, structure-indicating rods or capillaries are inserted into the holes formed by the chipped parts of the spacer and the support tube and then the drawing step is carried out. As a result, the PCF after the drawing step is provided with structure-indicating marks which are continuous along the direction of the fiber length and has a certain positional relationship with the inner structure of the PCF. The structure-indicating marks are effective for recognizing the inner structure of a polarization maintaining PCF, i.e., it allows easy recognition of the plane of polarization (a plane including a straight line connecting the centers of a pair of polarization maintaining pores and perpendicular to the cross section of the fiber).

BEST MODE FOR CARRYING OUT THE INVENTION

Hereinafter, embodiments of the present invention will be described in detail. In the following embodiments, an explanation is given of the case where a solid core is employed. However, the method for manufacturing the PCF of the present invention is also applicable even if a hollow core is employed.

Figure 5:
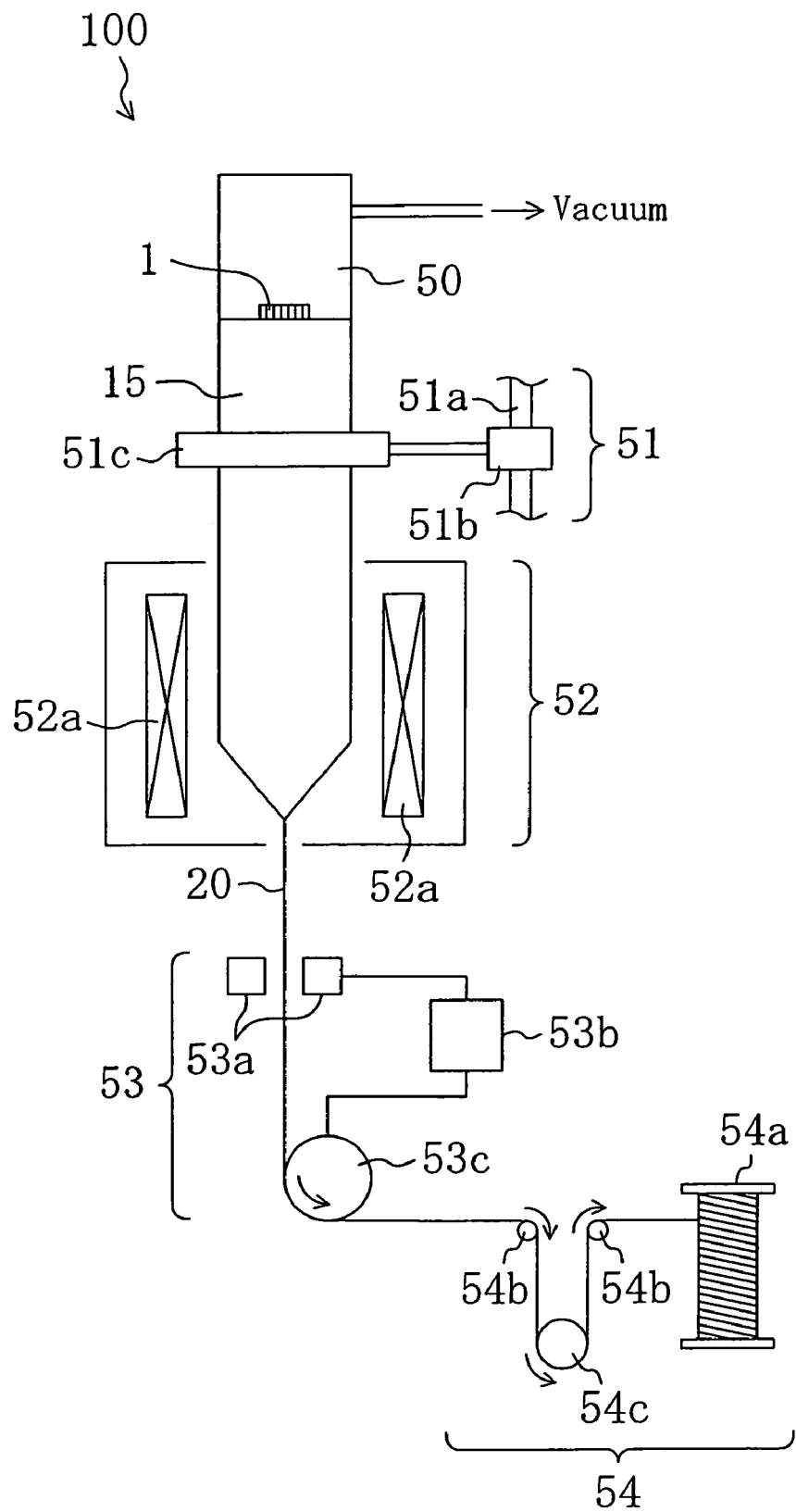
FIG. 5 is a schematic sectional view of a common PCF manufacturing apparatus.
Figure 6:
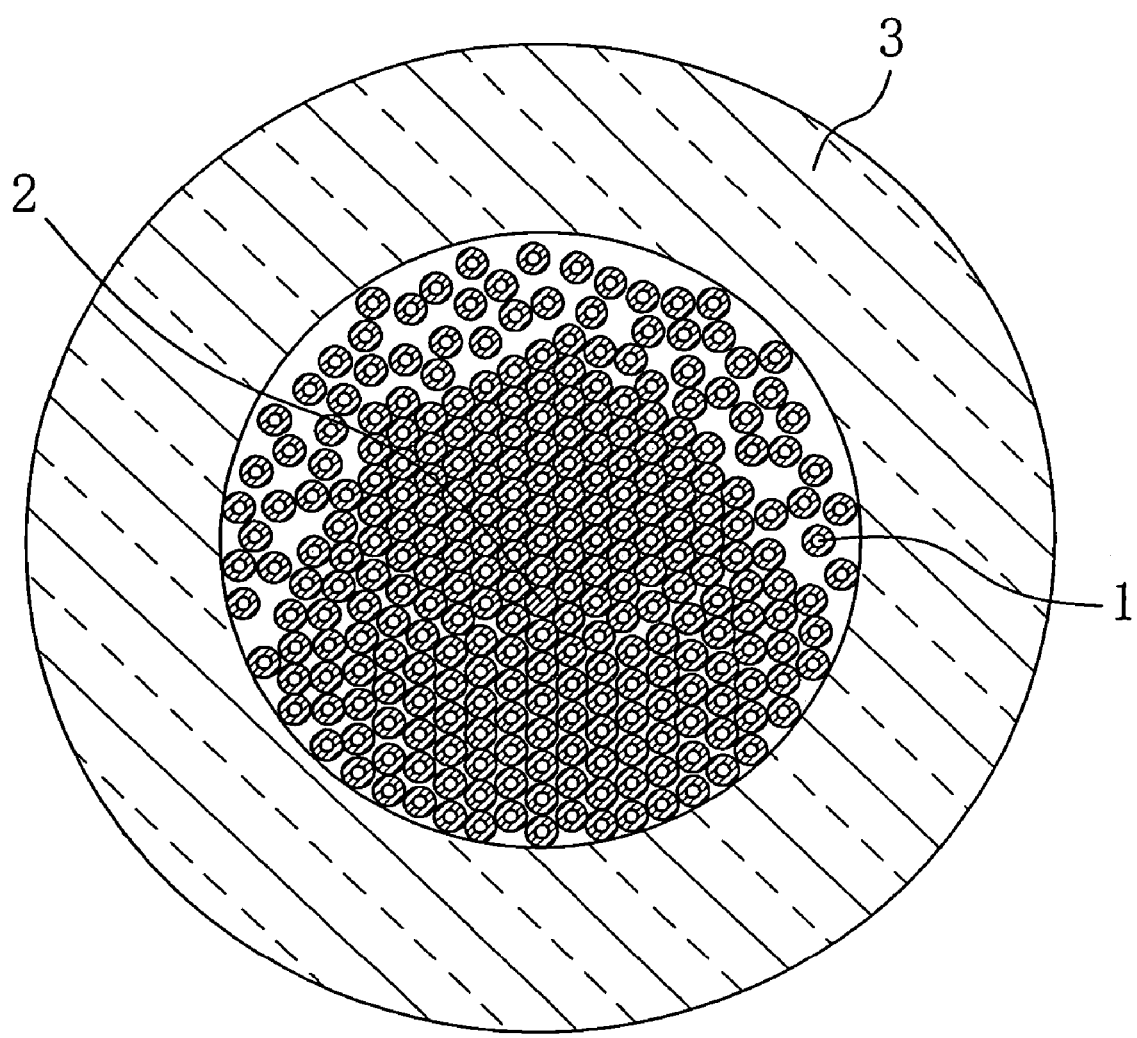
FIG. 6 is a schematic sectional view of a conventional preform.

FIG. 5 shows a commonly used PCF manufacturing apparatus 100.

The PCF manufacturing apparatus 100 includes a suction chamber 50, a preform feeder 51, a melting furnace 52, a fiber diameter control unit 53 and a winder 54.

The suction chamber 50 is in the form of a cylinder having a top surface and fitted over the top portion of a support tube 3 of a later-described preform 15. An exhaust pipe is provided at the side of the suction chamber 50 and connected to a vacuum pump. With the vacuum pump, the suction chamber 50 and the inside of the support tube 3, i.e., the outside of capillaries 1, are depressurized.

The preform feeder 51 includes a support rod 51a extending in the vertical direction, a moving part 51b which is up-and-down movably supported on the support rod 51a and a preform support 51c which extends from the moving part 51b in the horizontal direction. In the preform feeder 51, a preform 15 is supported in the perpendicular position by the preform support 51c and the moving part 51b moves from up to down along the support rod 51a to feed the perform 15 toward the melting furnace 52 at a predetermined speed.

The melting furnace 52 includes a heater 52a. The bottom portion of the preform 15 is introduced therein and molten by heating.

The fiber diameter control unit 53 includes a fiber diameter measuring instrument 53a, a fiber diameter controller 53b and a capstan 53c. The outer diameter of a PCF 20 is measured by the fiber diameter measuring instrument 53a in a noncontact manner. Through the fiber diameter controller 53b, the measured fiber diameter is reflected on the speed at which the preform feeder 51 feeds the perform 15 and the rotation speed of the capstan 53c to control the outer diameter of the PCF 20 to a predetermined value.

The winder 54 includes a bobbin 54a, rollers 54b and a dancer roller 54c and is adapted to wrap the PCF 20 around the bobbin 54a while the tension of the PCF 20 is kept unchanged.

Now, a step-by-step explanation is given of the manufacturing method of the present invention using the PCF manufacturing apparatus 100.

Embodiment 1

Hereinafter, a step-by-step explanation is give of the method for manufacturing a PCF according to Embodiment 1.

[Preparation Step]

First, prepared are: a plurality of cylindrical quartz capillaries 1; a columnar core rod 2 which is made of quartz and has the same outer diameter and length as those of the capillaries 1; a large-diameter cylindrical support tube 3 which is made of quartz and has the same length as that of the capillaries 1 and a pair of spacer parts 4 made of quartz and has the same length as that of the support tube 3.

The spacer parts 4 are half parts of a cylindrical tube which are cut along the circumference direction. The inner wall surface of each of the spacer parts 4 is shaped to have a half of a regular hexagonal cross-sectional shape. In this embodiment, two spacer parts 4 are paired. The cross-sectional shape of the inner wall surface of the spacer 4 is so designed that among the capillaries 1 which are closest packed in the spacer 4 to form a later-described preform 15, some facing the inner wall surface of the spacer 4 are brought into contact with the spacer inner wall surface when the perform 15 is drawn into a fiber.

[Preform Fabrication Step]

Figure 1:
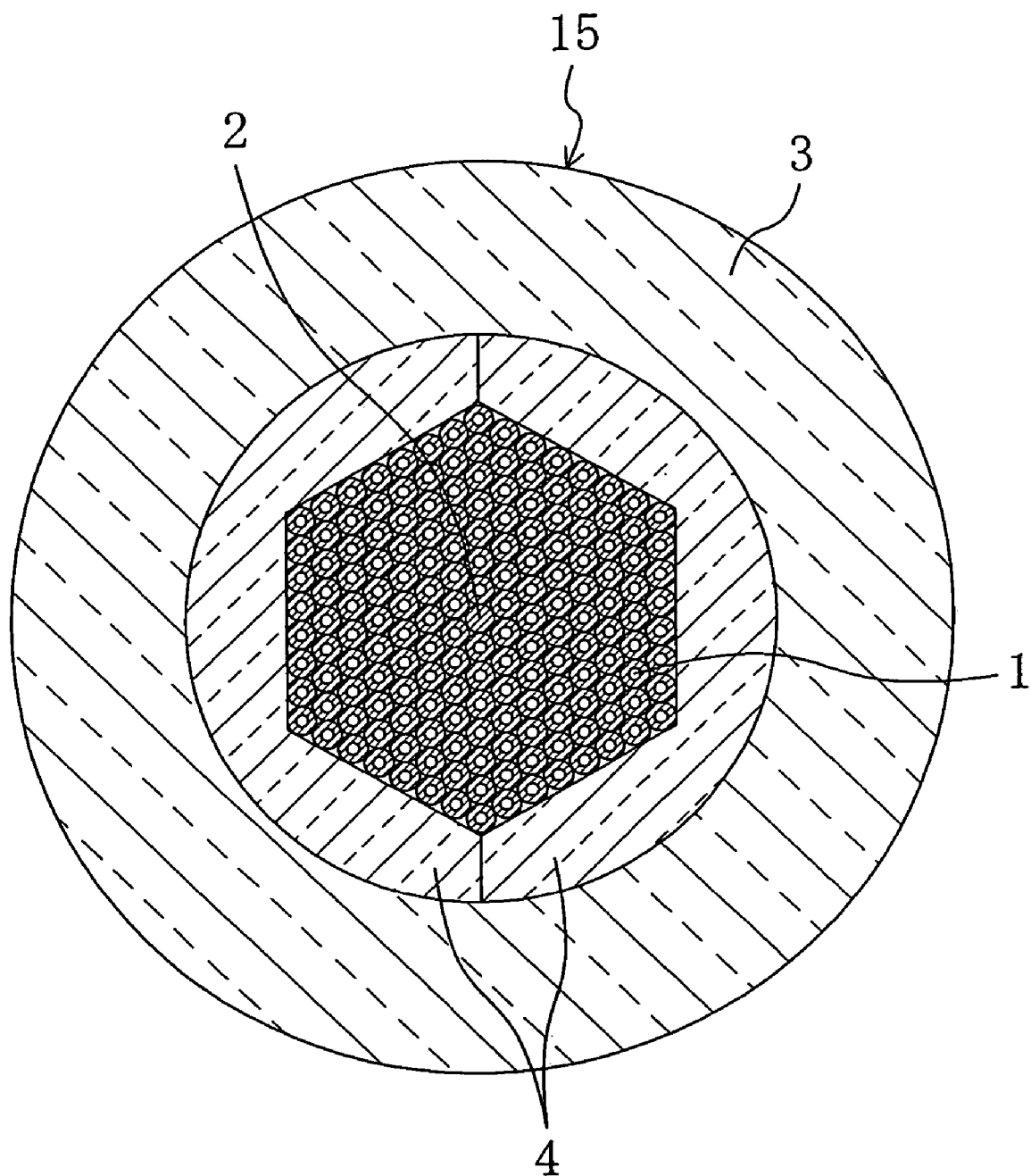
FIG. 1 is a schematic sectional view of a PCF preform according to Embodiment 1 of the present invention.

As shown in FIG. 1, the capillaries 1 and the core rod 2 are inserted into the support tube 3 to fill the support tube 3. More specifically, the paired spacer parts 4 are inserted into the support tube 3 and then the capillaries 1 and the core rod 2 are packed in the spacer 4. At this time, the capillaries 1 are laid side by side over one of the sides of the inner wall surface of the spacer 4 to form a first layer of capillaries and then the capillaries 1 are additionally stacked on the first layer to fit between adjacent pairs of the capillaries forming the first layer to form a second layer. In this way, multiple capillary layers are formed and the core rod 2 is arranged at the center axis position of the support tube 3. Thus, a perform 15 is obtained with the capillaries 1 packed in the support tube 3 and the core rod 2 arranged at the center axis position of the support tube 3.

According to the packing method described above, the spacer 4 is first arranged in the support tube 3 and then the capillaries 1 are inserted therein. However, the spacer 4 may be first filled with the capillaries 1 and then inserted into the support tube 3.

The end faces of the perform 15 may be heated to seal the ends of the capillaries 1. This inhibits generation of hydroxyl groups in the capillaries by a reaction between the capillaries and moisture in the air during drawing, thereby reducing loss of transmission in the PCF derived from the hydroxyl groups.

[Drawing Step]

The perform 15 thus formed in the preform fabrication step is placed to the preform support 51c of the preform feeder 51. Then, the top end of the support tube 3 of the perform 15 is fitted to the suction chamber 50.

Figure 2:
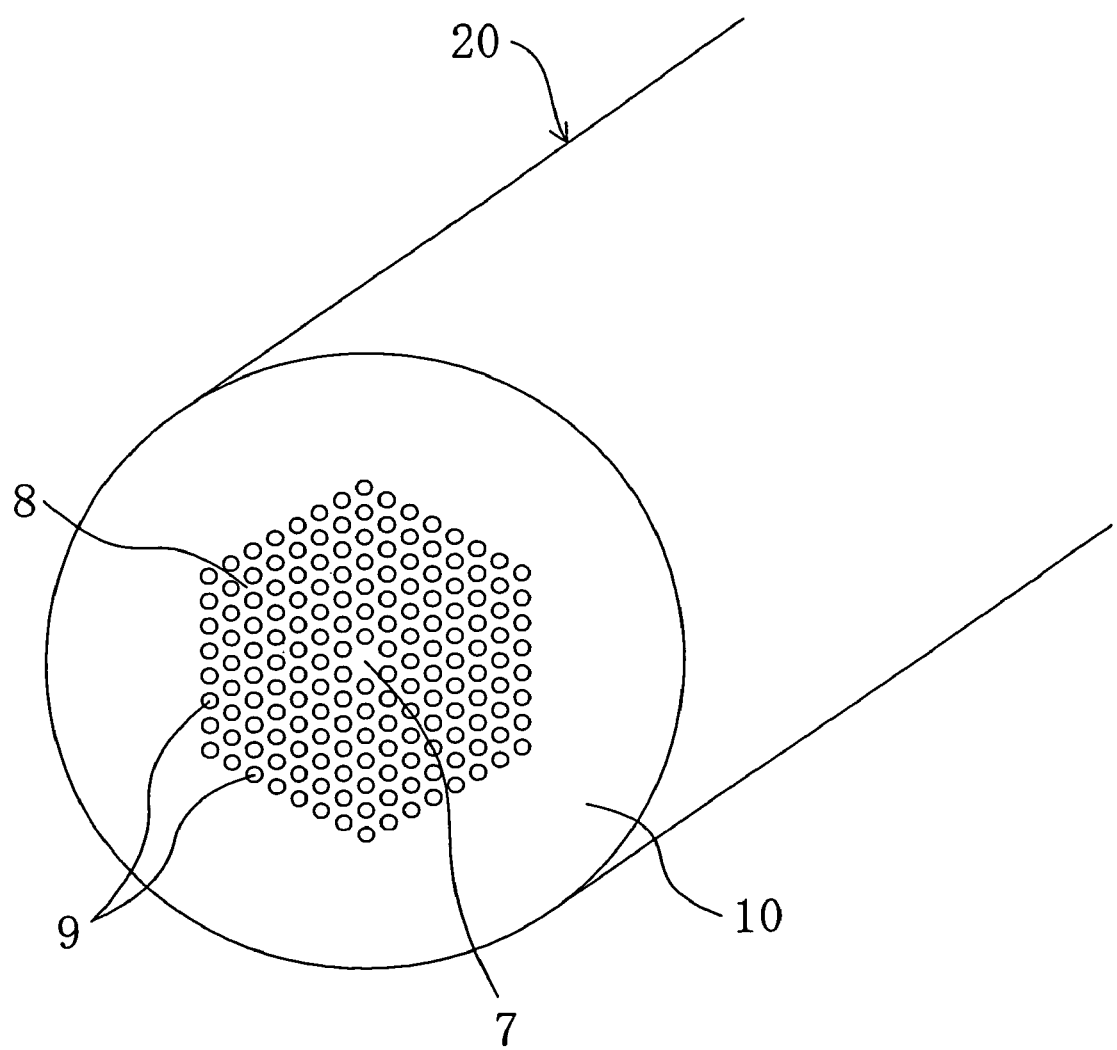
FIG. 2 is an oblique view of the PCF according to Embodiment 1 of the present invention.

The preform feeder 51 is activated, and then the bottom portion of the perform 15 is heated by the melting furnace 52 and drawn downward into a fiber. By so doing, the capillaries 1 adjacent to each other, the spacer parts 4, the capillaries 1 and the spacer parts 4, the capillaries 1 and the core rod 2, and the spacer parts 4 and the support rube 3 are fused into one piece, respectively. In this way, a PCF 20 as shown in FIG. 2 is obtained including a solid core 7, a cladding 8 surrounding the core 7 and including a plurality of pores 9 extending along the core 7 and a support 10 covering them.

Then, the outer diameter of the PCF 20 is measured immediately after the drawing using the fiber diameter measuring instrument 53a of the fiber diameter control unit 53. Then, based on the measured outer diameter, the fiber diameter controller 53b controls the speed at which the preform feeder 51 feeds the perform 15 and the rotation speed of the capstan 53c so that the outer diameter of the PCF 20 is adjusted to a predetermined value.

Then, the PCF 20 with the outer diameter adjusted to the predetermined value travels along the rollers 54b and the dancer roller 54c of the winder 54 and is wrapped around the bobbin 54a, while a certain tension is kept applied thereto by the dancer roller 54c.

According to the above-described method for manufacturing the PCF 20, the spacer 4 is provided between the support tube 3 and the capillaries 1. The spacer 4 gives the inner wall surface of the support tube 3 a regular hexagonal cross-sectional shape which allows closest packing of the core rod 2 and the capillaries 1. With the spacer 4 thus provided, the capillaries 1 are closest packed in the support tube 3 by repeating the step of laying the capillaries 1 side by side over one of the sides of the inner wall surface of the spacer 4 to form a first layer and the step of further stacking the capillaries 1 on the first layer to fit between adjacent pairs of the capillaries forming the first layer to form a second layer. This prevents the arrangement of the capillaries from being disarranged and the core from being misaligned with the center. As a result, the perform 15 is obtained while almost all the capillaries 1 are closest packed as a bundle in the support tube 3 via the spacer 4. Then, by drawing the perform 15 into a thin fiber, almost 100% of the packed capillaries 1 function as photonic crystal after the drawing. In addition, since the capillaries 1 near the inner wall surface of the support tube 3 and those near the core are packed at the same density, the bunched capillaries 1 shrink uniformly in the drawing step. Therefore, the interstice (lattice defect) between the bunched capillaries is minimized. Further, since the spacer 4 is formed of two spacer parts 4 separated in the circumference direction, each of the inner wall surfaces of the spacer parts 4 is shaped to have a predetermined configuration, i.e., a half of the regular hexagonal cross-sectional shape, with ease and great precision. Further, insertion of the spacer parts 4 into the support tube 3 is carried out in an easy and reliable manner. This method is also applicable in using a long support tube 3, thereby permitting the fabrication of the PCF 20 of greater length.

Since the inner wall surface of the spacer 4 having the regular hexagonal cross-sectional shape is so designed that among the capillaries 1 closest packed in the support tube 3 to form the preform 4, some facing the inner wall surface of the spacer 4 are brought into contact with the inner wall surface of the spacer 4 when thinning the preform by the drawing step. Therefore, the degree of freedom of the capillaries 1 in the drawing step is greatly reduced, thereby effectively preventing the capillaries 1 from being disarranged. Further, the space between the inner wall surface of the spacer 4 and the capillaries 1 becomes extremely small and the capillaries 1 are closest packed in the spacer 4 sequentially from the inner wall surface of the spacer 4 to the core. Therefore, it is hardly necessary to take care not to disturb the arrangement of the capillaries 1 and the packing of the capillaries 1 in the support tube 3 (spacer 4) is carried out with higher efficiency. This allows the closest packing of the capillaries for forming the cladding in an easy and reliable manner.

Now, an explanation is given of an experiment which has been actually carried out.

In the same manner as in the above-mentioned embodiment, a pair of spacer parts 4, which are halves of a cylindrical spacer whose inner wall surface has a regular hexagonal cross-sectional shape, is arranged in a cylindrical support tube 3 made of quartz. Thus, a 125 µm-diameter PCF 20 having a 5 µm-diameter core 7 and a 125 µm-diameter PCF 20 having a 2.5 µm-diameter core 7 were formed as inventive examples. As comparative examples, PCFs 20 were formed in the same manner as the inventive examples except that the spacer parts 4 were not arranged.

As to the thus obtained PCFs 20, a gap between the center axis of the core 7 and that of the fiber was measured.

The results are shown in Table 1.

TABLE 1

|  | Gap between center axes (µm) Core diameter (µm) | |
| --- | --- | --- |
|  | 5 | 2.5 |
| Comparative example | 1.1 | 0.8 |
| Inventive example | 0.15 | 0.2 |

According to Table 1, when the core diameter is 5 µm, the gap between the center axes is 1.1 µm in the comparative example, while it is 0.15 µm in the inventive example. That is, the present invention has allowed reducing the gap between the center axes to about ⅐. Further, when the core diameter is 2.5 µm, the gap between the center axes is 0.8 µm in the comparative example, while it is 0.2 µm in the inventive example. It is understood that the present invention has allowed reducing the gap between the center axes to about ¼. In particular, when the PCF 20 having the large-diameter core 7 is formed by the conventional method without using the spacer, the diameter of the capillaries 1 and the core rod 2 increases, and as a result, the gap generated by the disturbed arrangement becomes significant. However, according to the method of the present invention, even if the diameter of the core 7 is 5 µm, the gap between the core center axis and the fiber center axis is reduced to about ⅐. Therefore, this problem has been solved. Thus, the present invention is effective for the fabrication of the PCF 20 with the large-diameter core 7.

Embodiment 2

Hereinafter, a step-by-step explanation is give of the method for manufacturing a PCF according to Embodiment 2.

[Preparation Step]

First, prepared are: a plurality of cylindrical, small-diameter capillaries 1 made of quartz; two cylindrical, quartz-made structure-indicating capillaries 6 of a small diameter which indicates the inner structure of the fiber; two cylindrical, quartz-made polarization maintaining capillaries 5 of a large diameter; a single columnar core rod 2 which is made of quartz and has the same diameter and length as those of the capillaries 1; a cylindrical, quartz-made support tube 3 which is shorter than the capillaries 1 and the core rod 2; and a pair of spacer parts 4 which are made of quartz and have the same length as that of the support tube 3.

The spacer parts 4 are halves of a cylindrical tube cut along the circumference direction and each of the spacer parts 4 has an inner wall surface which forms a half of a regular hexagonal cross-sectional shape. In this embodiment, two spacer parts 4 are paired. Further, the inner wall surface of the spacer 4 are so designed that among the capillaries 1 which are closest-packed in the spacer 4 to form a later-described preform, some facing the inner wall surface of the spacer 4 are brought into contact with the spacer inner wall surface when drawing the preform into a fiber. Each of the spacer parts 4 has chipped parts at corners on the outer circumference thereof for providing voids in which the structure-indicating capillaries 6 shall be arranged.

The structure-indicating capillaries 6 described above are in the form of a hollow cylinder. However, they may be solid columnar rods. In such a case, the structure-indicating capillaries 6 preferably have a refractive index different from that of other components such that the structure-indicating capillaries 6 can be recognized as later-described structure-indicating marks 11 after the drawing step.

[Preform Fabrication Step]

Figure 3:
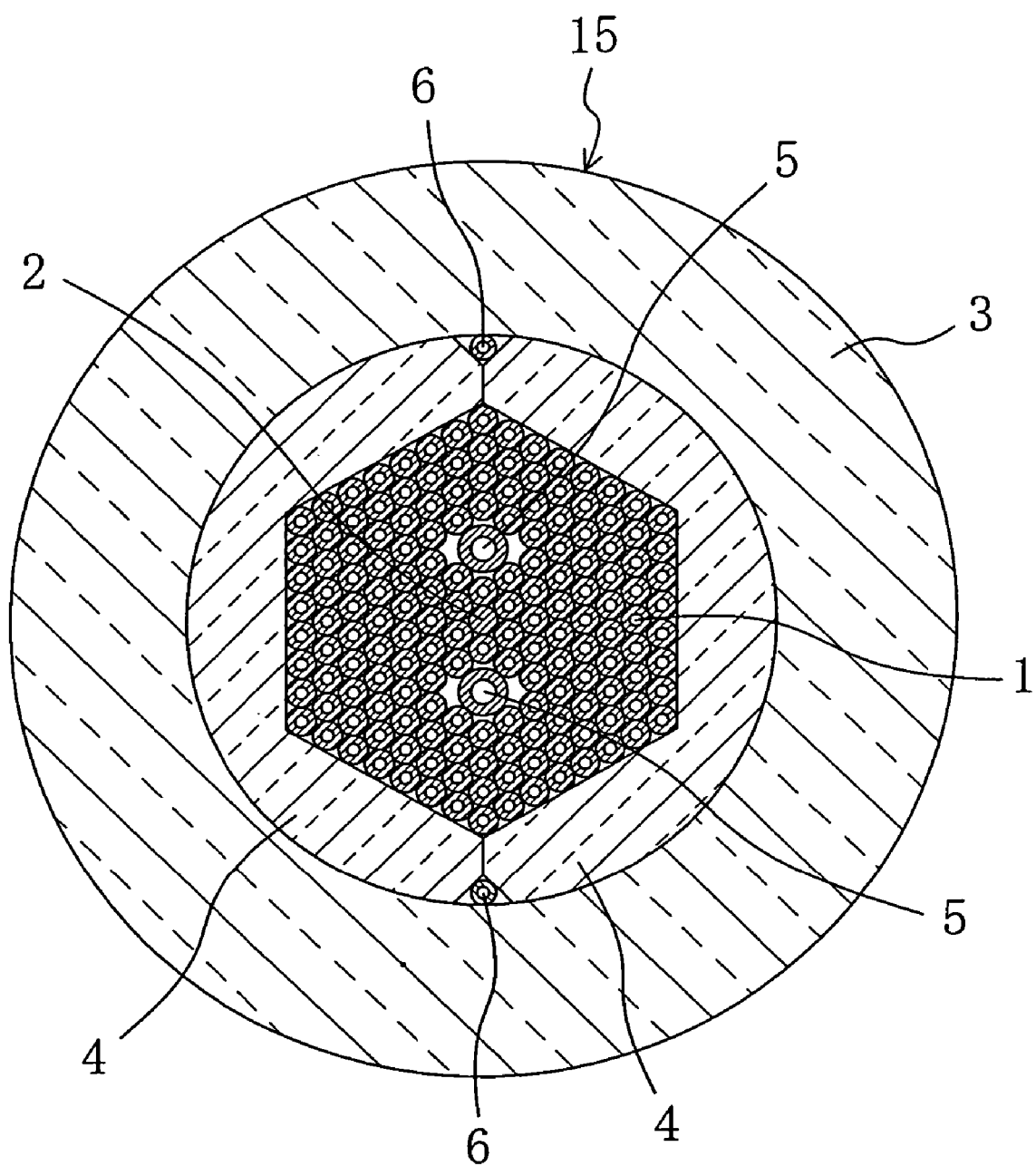
FIG. 3 is a schematic sectional view of a preform of a polarization maintaining PCF according to Embodiment 2 of the present invention.

As shown in FIG. 3, a plurality of capillaries 1, two polarization maintaining capillaries 5, two structure-indicating capillaries 6 and a core rod 2 are inserted in a support tube 3 to fill the support tube 3. More specifically, paired spacer parts 4 are inserted in the support tube 3 and the structure-indicating capillaries 6 are inserted into insertion holes formed between the chipped parts of the spacer parts 4 and the support tube 3. Then, the capillaries 1 and the core rod 2 are packed in the spacer 4. At this time, the capillaries 1 are laid side by side over one of the sides of the inner wall surface of the spacer 4 to form a first layer of capillaries. Then, the capillaries 1 are further stacked on the first layer to fit between adjacent pairs of the capillaries forming the first layer to form a second layer. In this way, multiple capillary layers are formed and the core rod 2 is arranged at the center axis position of the support tube 3. Further, the two polarization maintaining capillaries 5 are arranged at predetermined positions collinear with the contacts between the spacer parts 4. Thus, a perform 15 is obtained including the capillaries 1 which is packed in the support tube 3, the core rod 2 which is arranged at the center axis position of the support tube 3, the polarization maintaining capillaries 5 which are arranged at predetermined positions outside the core rod 2 and collinear with the contacts between the spacer parts 4 and the structure-indicating capillaries 6 which are arranged at predetermined positions outside the polarization preservation capillaries 5 and collinear with the contacts between the spacer parts 4 and in contact with the support tube 3.

According to the packing method described above, the spacer 4 and the structure-indicating capillaries 6 are arranged in the support tube 3 and then the capillaries 1 are packed therein. However, the capillaries 1 may be first packed in the spacer 4 and then the spacer 4 may be then inserted into the support tube 3 together with the structure-indicating capillaries 6.

Further, the end faces of the perform 15 may be heated to seal the ends of the capillaries 1. This inhibits generation of hydroxyl groups in the capillaries by a reaction between the capillaries and moisture in the air in a drawing step, thereby reducing loss of transmission of the PCF derived from the hydroxyl groups.

[Drawing Step]

Figure 4:
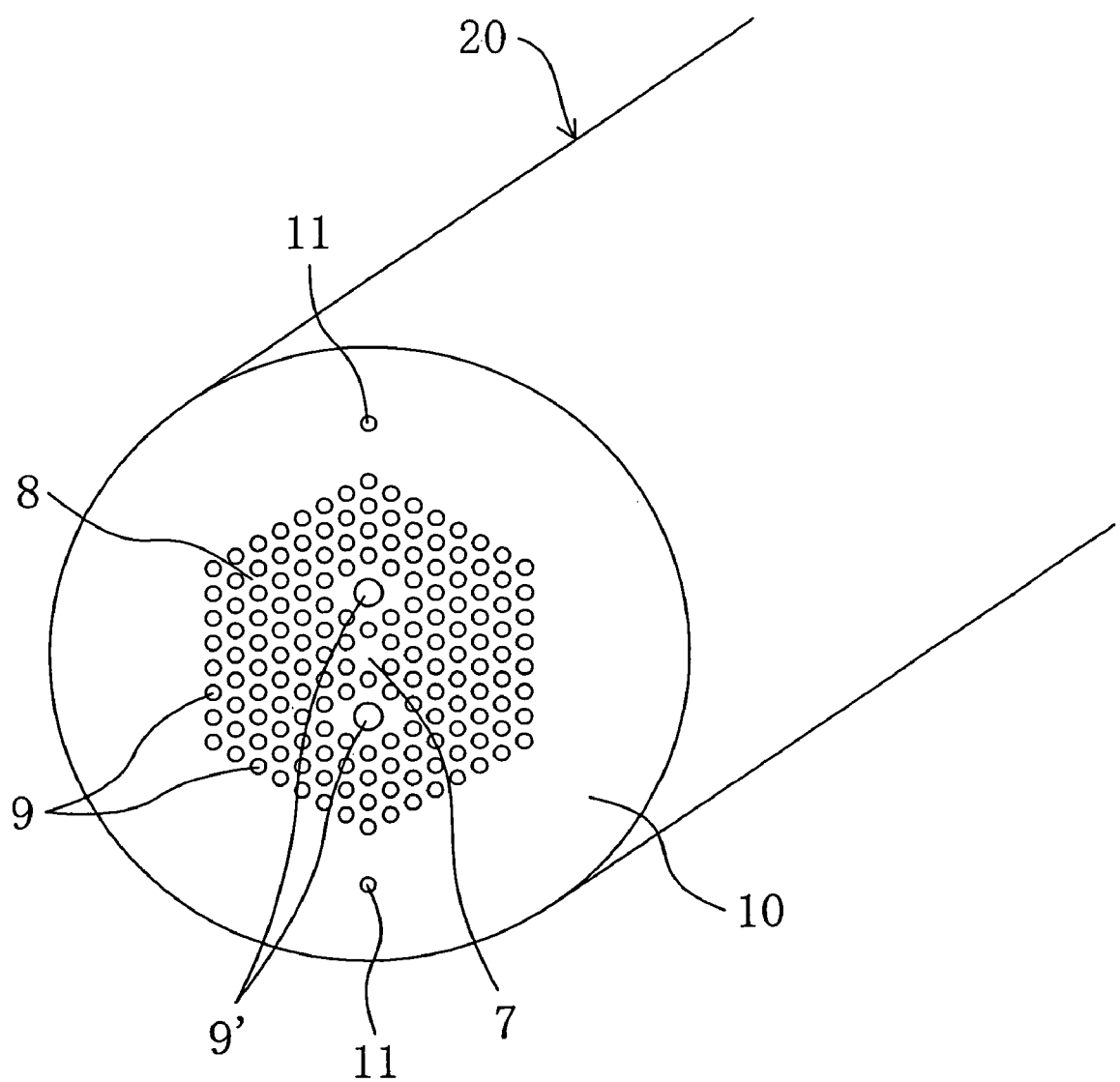
FIG. 4 is an oblique view illustrating the polarization maintaining PCF according to Embodiment 2 of the present invention.

The perform 15 thus formed in the preform fabrication step is drawn into a fiber in the same manner as in Embodiment 1. At this time, the capillaries 1 adjacent to each other, the spacer parts 4, the capillaries 1 and the spacer parts 4, the capillaries 1 and the core rod 2, the capillaries 1 and the polarization maintaining capillaries 5, the spacer parts 4 and the support tube 3, the spacer parts 4 and the structure-indicating capillaries 6 and the structure-indicating capillaries 6 and the support tube 3 are fused into one piece, respectively. As a result, a polarization maintaining PCF 20 as shown in FIG. 4 is obtained including a solid core 7, a cladding 8 surrounding the core 7 and including a plurality of pores 9 extending along the core 7 and a pair of polarization maintaining pores 9', structure-indicating marks 11 for indicating where a plane of polarization is and a support 10 covering these components.

Subsequently, the step using the fiber diameter control unit 53 and the winder 54 is carried out. An explanation thereof is omitted because the step is substantially the same as that of Embodiment 1.

According to the above-described method for manufacturing the PCF 20, drawing is performed while the polarization maintaining capillaries 5 and the structure-indicating capillaries 6 are arranged at predetermined positions collinear with the contacts between the spacer parts 4. Therefore, in addition to the effects of Embodiment 1, the resulting PCF 20 functions as a polarization maintaining PCF and includes the structure-indicating marks 11 which are continuous along the direction of the fiber length and have a certain positional relationship with the inner structure of the fiber. As a result, the inner structure of the PCF 20 is determined with the help of the structure-indicating marks 11. Therefore, the plane of polarization is easily identified.

In Embodiments 1 and 2 described above, the spacer used has an inner wall surface which is shaped to have a regular hexagonal cross-sectional shape, but the present invention is not limited thereto. For example, the inner wall surface of the spacer may be shaped to have a substantially regular hexagonal cross-sectional shape with round corners, i.e., adjacent sides of the hexagon may be connected by arcs, respectively. In such a case, each of the arcs is preferably designed to have a radius not larger than ½ of the maximum diameter of the capillaries. If the radius is larger than ½ of the maximum diameter of the capillaries, the capillaries arranged at the corners do not fit into the corners properly, thereby hindering the closest packing of the capillaries.

The present invention is not limited to the embodiments above but applicable to other configurations than those described above.

INDUSTRIAL APPLICABILITY

As described above, the present invention is suitable for the manufacture of a PCF having a solid or hollow core and a cladding which surrounds the core and includes a plurality of pores extending along the core.

The invention claimed is:

1. A method for manufacturing a photonic crystal fiber comprising a solid or hollow core and a cladding which surrounds the core and includes a plurality of pores extending along the core, the method comprising:
    forming a preform by packing in a support tube a core rod for forming the solid core and a plurality of capillaries for forming the cladding, or by providing a core space for forming the hollow core in the support tube and packing in a support tube a plurality of capillaries for forming the cladding;
    drawing the preform into a fiber under heating; and
    arranging a spacer formed of two or more spacer parts in the support tube such that the inner wall surface of the support tube has a substantially regular polygonal cross-sectional shape such that the core rod and the capillaries or the capillaries only are as closely packed as possible;
    the spacer includes two adjacent spacer parts and each of the two adjacent spacer parts includes a chipped part chipped parts for providing insertion holes which extend in the lengthwise direction thereof between the chipped parts; and
    structure-indicating rods or capillaries are fitted into the insertion holes between the chipped parts.

* * * * *